Nov. 1, 1927.
W. MORRISON
1,647,650
ELECTROLYTIC RECTIFIER
Filed Oct. 15, 1925
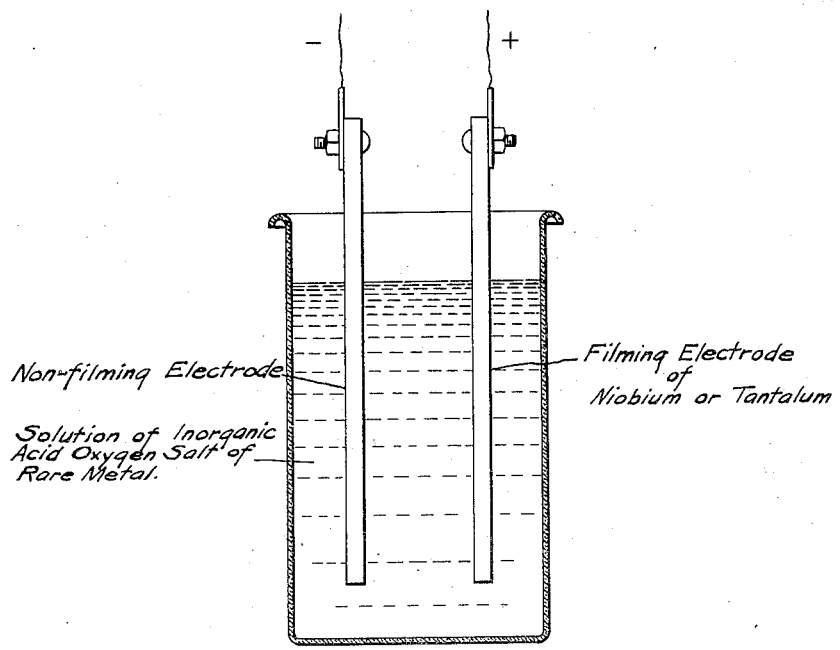
Inventor:
William Morrison
By Byrnes Townsend & Brickenstein
his Attorneys Patented Nov. 1, 1927.

1,647,650

UNITED STATES PATENT OFFICE.

WILLIAM MORRISON, OF CHICAGO, ILLINOIS; MARGRET MORRISON ADMINISTRATRIX OF SAID WILLIAM MORRISON, DECEASED.

ELECTROLYTIC RECTIFIER.

Application filed October 15, 1925. Serial No. 62,661.

My invention relates to an electrolytic rectifier particularly adapted for use in connection with a source of alternating current for furnishing unidirectional current to the elements of tubes used in radio work and for charging storage batteries.

As the filming electrode I may use metallic niobium or tantalum, and as the non-filming electrode I use lead, platinum, or any other non-filming metal not materially attacked by the electrolyte, or carbon.

For the electrolyte I use a solution of the sulfate of thorium or cerium or other rare metal, or a mixture of such sulfates. One such mixture can readily be obtained by dissolving "misch-metall" (the mixture of cerium metals obtained from monazite sand) in sulfuric acid and evaporating the solution to dryness. The sulfates so obtained are then dissolved in water.

I have found that a rectifier so constructed is capable of use with a very high difference of potential.

The film formed on the niobium or tantalum plate when operated with the solutions above described is very permanent and unusually resistant to the passage of current from the filming electrode, but permits flow of current from the non-filming electrode to the plate.

I prefer to use the sulfate salts but the salts of other oxygen-containing inorganic acids, such as nitric acid, may be used.

The accompanying drawing illustrates the described rectifier, the figure being a transverse vertical section through the cell and electrolyte, the electrode being shown in elevation.

I claim:

1. An electrolytic rectifier having an electrode of material selected from the group consisting of niobium and tantalum and an electrode of a non-filming conductor in an electrolyte comprising a sulfate of a rare metal.

2. An electrolytic rectifier having an electrode of material selected from the group consisting of niobium and tantalum, and an electrode of a non-filming conductor in an electrolyte comprising a mixture of sulfates of the rare metals.

3. An electrolytic rectifier as claimed in claim 1 in which the electrolyte is thorium sulfate.

4. In an electrolytic rectifier having a filming electrode and a non-filming electrode, an electrolyte comprising a sulfate of a rare metal.

5. In an electrolytic rectifier having a filming electrode and a non-filming electrode, an electrolyte comprising a mixture of sulfates of the rare metals.

6. In an electrolytic rectifier having a filming electrode and a non-filming electrode, an electrolyte of thorium sulfate.

7. In an electrolytic rectifier, having a filming electrode and a non-filming electrode, an electrolyte comprising an inorganic acid oxygen salt of a rare metal.

8. In an electrolytic rectifier having a filming electrode and a non-filming electrode, an electrolyte comprising a thorium salt of an oxygen-containing inorganic acid.

9. In an electrolytic rectifier having a filming electrode and a non-filming electrode, an electrolyte comprising an oxygen-containing inorganic acid salt of a rare metal of the left-hand column of Group IV of Mendelejeff's Periodic System of the Elements.

10. In an electrolytic rectifier having a filming electrode and a non-filming electrode, an electrolyte comprising a sulfate of a rare metal of the left-hand column of Group IV of Mendelejeff's Periodic System of the Elements.

In testimony whereof, I affix my signature.

WILLIAM MORRISON.